US005277412A

United States Patent [19]

Pringle

[11] Patent Number: 5,277,412

[45] Date of Patent: Jan. 11, 1994

[54] ASSEMBLY ORIENTATION JIG

[75] Inventor: Gary W. Pringle, Rochester, N.Y.

[73] Assignee: Xerox Corporation, CT

[21] Appl. No.: 964,731

[22] Filed: Oct. 22, 1992

[51] Int. Cl.[5] ................................................ B23Q 1/00

[52] U.S. Cl. ....................................... 269/47; 269/133; 269/157; 269/305; 269/237; 269/296

[58] Field of Search .............................. 269/47, 50–52, 269/133, 254 CS, 157, 305, 237, 238, 309, 296

[56] References Cited

U.S. PATENT DOCUMENTS

| | | | |
|---|---|---|---|
| 1,310,538 | 7/1919 | Moore | 269/47 |
| 2,130,286 | 9/1938 | Mullins | 269/47 |
| 2,529,452 | 11/1950 | Janes et al. | 269/254 CS |
| 2,853,771 | 9/1958 | Melville | 269/50 |
| 3,385,592 | 5/1968 | Hasell et al. | 269/133 |
| 4,711,438 | 12/1987 | Guarino | 269/254 CS |
| 5,160,125 | 11/1992 | Jenkins | 269/50 |

*Primary Examiner*—Robert C. Watson

*Attorney, Agent, or Firm*—Denis A. Robithille

[57] ABSTRACT

An orientation jig for facilitating assembly of a structure including a plurality of structural members and for positioning each structural member in predetermined orientation with respect to one another is provided. The orientation jig includes a mounting fixture and a pivotable orientation bracket mounted on the mounting fixture, wherein the mounting bracket is adapted to receive a structural member in a predetermined orientation.

8 Claims, 3 Drawing Sheets

ASSEMBLY ORIENTATION JIG

The present invention relates generally to a manufacturing jig for facilitating the assembly of a frame structure, and more particularly, relates to an assembly orientation jig for assuring the proper orientation of a structural member with respect to other structural members on an assembly platform.

Many machines and other articles of manufacture include a skeleton-like frame for providing structural integrity to the machine while furnishing a support structure for mounting components and other devices thereto. The frame generally consists of a plurality of frame elements or other structural members which are assembled on an assembly platform for proper positioning relative to one another prior to welding or otherwise fastening the structural members to one another. Manufacturing processes of this type are well known and are typically used to commence the manufacture of relatively large consumer goods or machines, as for example, in the manufacture of electrophotographic printing machines.

Prefabrication of a frame on an assembly platform yields great advantages with respect to assembly line type procedures in the sense of work efficiency and rationalization. However, a major problem, leading to rework or scrapping of fabricated frames, results from the fact that each structural member of the frame may include specific fixtures such as support pins, fastening brackets and/or mounting apertures for securing components onto the frame to produce the finished product. It is often critical that each of these fixtures be positioned and oriented in a particular manner in the finished frame assembly so that a properly serviceable and functional frame is provided for subsequent manufacturing processes. Thus, it would be beneficial to assure proper orientation of each structural member with respect to one another during the initial assembly process prior to welding or otherwise permanently bonding the structural members to form the frame assembly. Moreover, if a particular structural member is improperly oriented in the frame assembly, the error is often not found until the manufacturing process is further completed, thereby leading to rework and sometimes scrapping of the frame.

Clearly, it would be advantageous to eliminate the possibility of improperly orienting structural members in a frame assembly prior to further assembly thereof. In particular, with respect to the present invention, this objective is fulfilled by positioning each structural member in a predetermined proper orientation with respect to other structural members on an assembly platform for subsequent welding or otherwise permanent bonding of the structural members to produce the frame assembly.

In accordance with the present invention, an orientation jig for placing a structural member including an orientation element in a predetermined orientation on an an assembly platform is provided. The orientation jig includes a mounting fixture and a pivotable orientation bracket including a pivot axis for pivotably mounting the orientation bracket on the mounting fixture, wherein the orientation bracket is adapted to receive the structural member in the predetermined orientation. The orientation jig of the present invention is utilized to for facilitate the assembly of a structure including a plurality of structural members and is particular useful for positioning each structural member in predetermined orientation with respect to one another.

This and other aspects of the present invention will become apparent from the the following description in conjunction with the accompanying drawings, in which.

Figure 1:
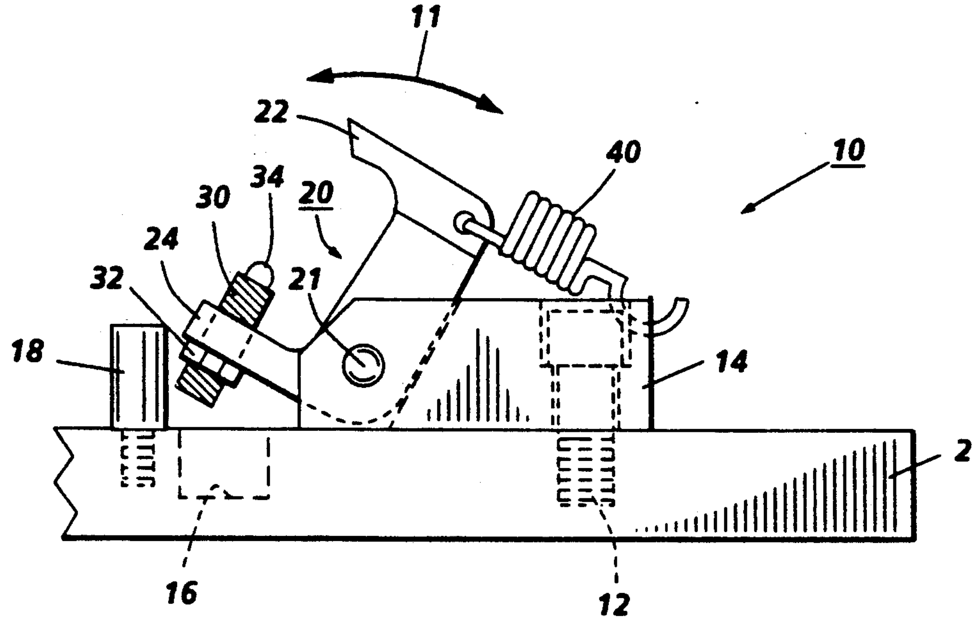
FIG. 1 is an elevational view of the orientation jig of the present invention.

While the present invention will be described with reference to preferred embodiments thereof, it will be understood that the invention is not to be limited to these preferred embodiments. On the contrary, it is intended that the present invention cover all alternatives, modifications, and equivalents as may be included within the spirit and the scope of the invention as defined by the appended claims. Other aspects and features of the present invention will become apparent as the description proceeds, wherein like reference numerals have been used throughout the Figures to designate identical elements.

Figure 4:
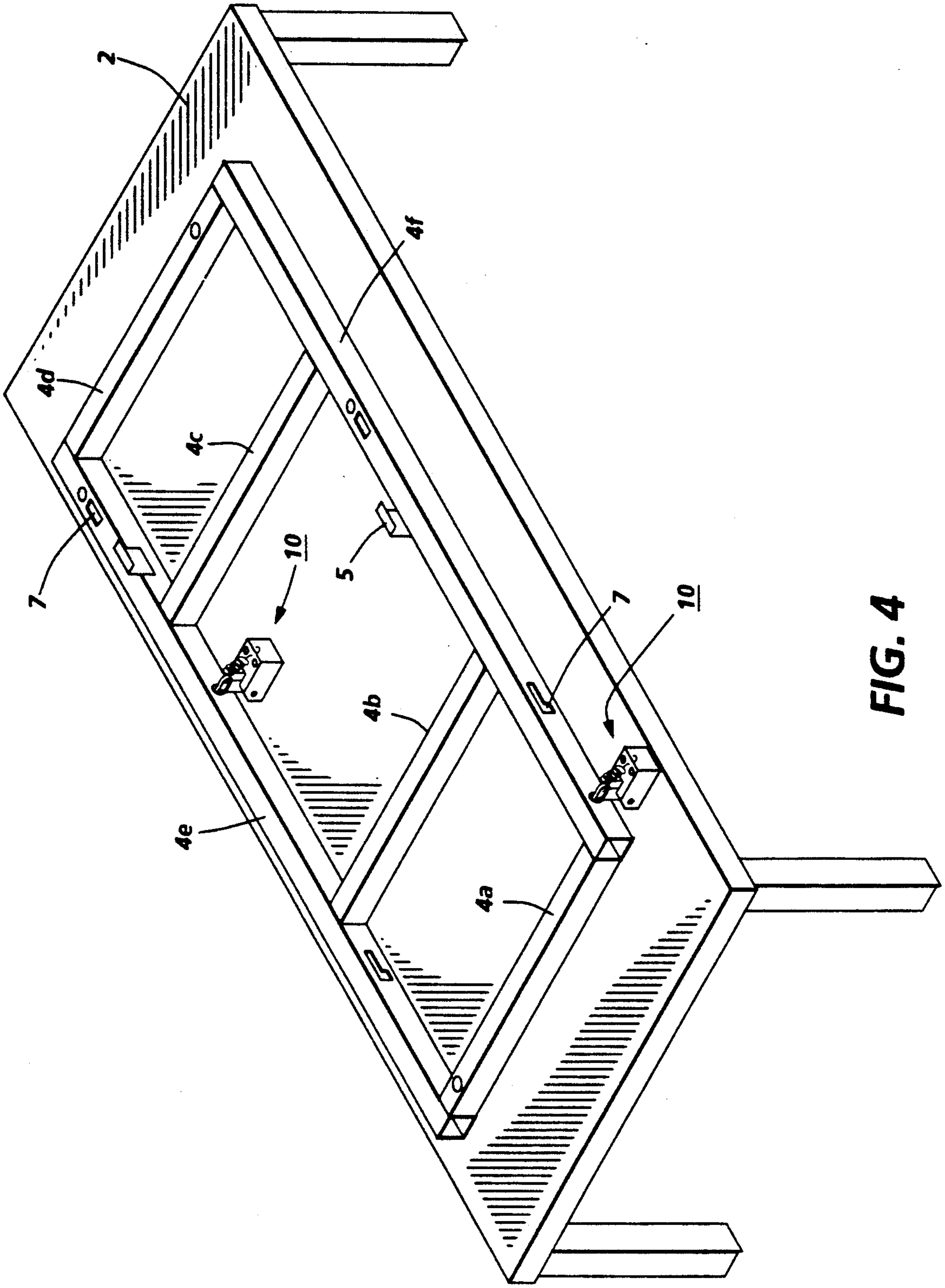
FIG. 4 is a perspective view of an assembly platform illustrating the manner in which the orientation jig of the present invention is used to properly orient structural members of a frame assembly during the manufacture thereof.

For a general understanding of the frame assembly process and an apparatus in which the features of the present invention may be incorporated, reference is initially made to FIG. 4, prior to discussing the specific features of the present invention. FIG. 4 shows a perspective view of an exemplary assembly platform 2 utilized to facilitate the assembly of a frame structure, including a plurality of pre-cut and pre-machined structural members 4*a*–4*f* (identified generically herein as structural member 4), incorporating a plurality of orientation jigs 10 in accordance with the present invention. Typically, each of the structural members 4*a*–4*f* is placed on the assembly platform 2 and properly positioned and oriented relative to one another prior to joining all of the frame members, as for example, by welding, bonding, or otherwise fastening corresponding elements with one another.

It will be observed from FIG. 4 that each structural member may include a specific fixture such as a fastening bracket 5 and/or mounting apertures 7 for use in mounting components, doors, or various other frame mounted devices onto the finished frame assembly. Thus, the improper orientation of any given frame member, either by lateral or lengthwise rotation thereof, may result in the misplacement of a specific fixture. As a result, it is a critical step in the assembly process to position each structural member in proper orientation with respective structural members so as to provide a serviceable and functional frame assembly after the manufacturing process is complete. As such, the present invention is directed toward an orientation jig for positioning each structural member of a frame or other assembly in predetermined orientation with one another on an assembly platform. Although the orientation jig of the present invention is particularly well adapted for use in the assembly of frames or frame-like structures, it will become apparent from the following discussion that the present invention is equally well-suited for use in a wide variety of manufacturing processes as well as in any other fabrication method wherein proper orientation of structural members or component workpieces is important. Further, it will be understood that the present invention is not necessarily limited in its application to the particular embodiment or embodiments shown herein.

Figure 2:
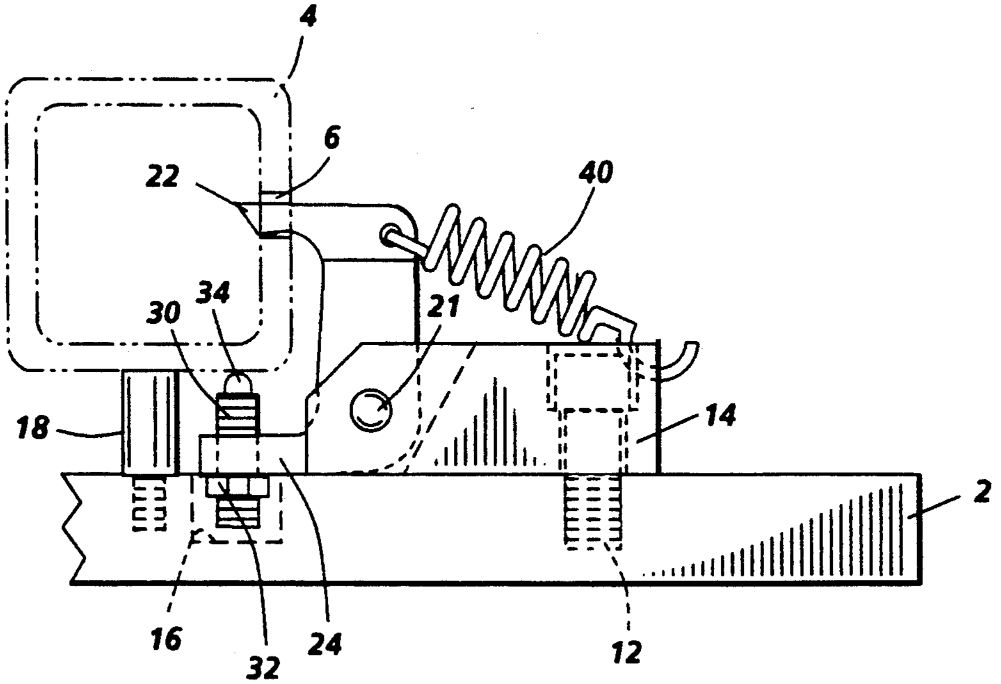
FIG. 2 is another elevational view of the orientation jig of the present invention, showing a structural member mounted for proper orientation in the orientation jig.
Figure 3:
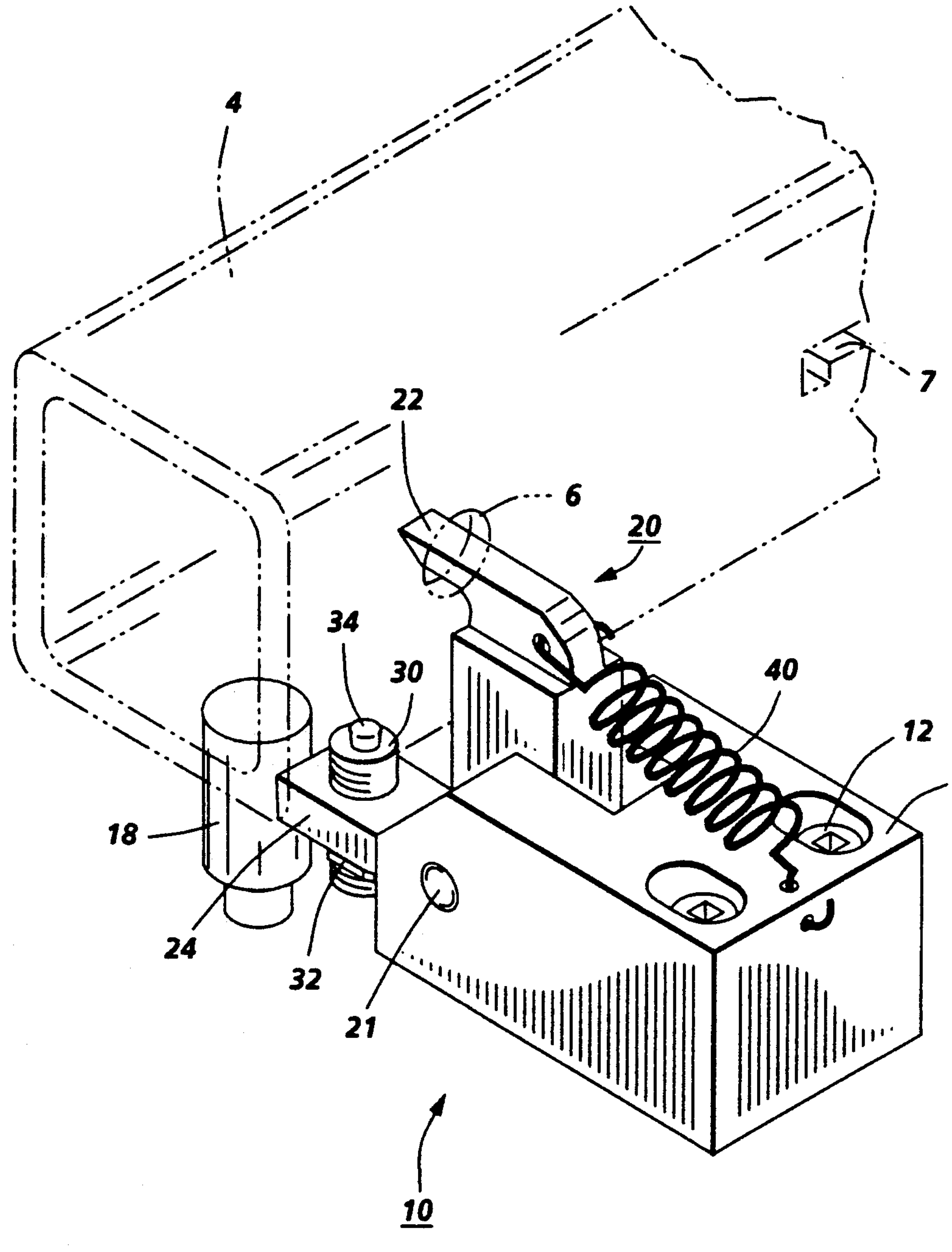
FIG. 3 is a perspective view of the orientation jig of the present invention, including the FIG. 2 structural member.

The orientation jig according to the present invention, identified generally as reference numeral 10, is illustrated in FIGS. 1–3. The orientation jig 10 includes a mounting fixture 14 for mounting on the assembly platform 2 via a mounting screw 12 or any other suitable fastening device. A pivotable orientation bracket 20 is mounted on the mounting fixture 14 along an axis 21 such that the orientation bracket 20 is capable of being pivoted about the axis 21, as indicated by arrow 11. An orientation finger 22 extends from the orientation bracket 20 in a direction substantially tangential to the moment of rotation or pivoting thereof.

A spring element 40 is coupled between the mounting fixture 14 and the orientation bracket 20 for urging the orientation bracket 20 into a an open position for receiving a structural member 4 in the orientation jig 10. The spring element 40 also acts to automatically withdraw the orientation finger 22 from an orientation aperture of a structural member 4 placed in the orientation bracket 20 upon removal thereof from the assembly jig 10, as will be discussed further hereinbelow.

Orientation bracket 20 is also provided with a seating flange 24 located opposite the orientation finger 22 for receiving a seating shaft 30 having a support face 34. Seating shaft 30 preferably comprises a threaded shaft member and a cooperative adjustment nut 32 for selectively adjusting the height of the seat face 34. This adjustable arrangement allows for horizontal positioning of the support face 34 of the seating shaft 30 for bearing against the structural member 4 when it is mounted in the orientation bracket 20. A recess 16 is provided in the assembly platform 2 for receiving the free-end of the seating shaft 30 when the structural member 4 is mounted on the orientation bracket 20. A support post 18 may also be mounted onto the assembly platform 2 for providing a datum surface, also referred to as a "home position", to maintain the structural member 4 in a coplanar condition with respect to the other structural members **4*a*–4*e* making up the frame assembly when mounted in the orientation jig 10** of the present invention on the assembly jig.

The operation of the orientation jig 10 of the present invention is shown in FIGS. 2 and 3, wherein a frame element, as for example structural member 4, is shown having an orientation aperture 6. The structural member 4 is positioned on the orientation bracket 20 such that orientation finger 22 is inserted into the orientation aperture 6 in the structural member 4. As the frame element 4 is placed on the orientation bracket 20, the frame member is pressed against the support face 34 of support shaft 30, forcing the entire orientation bracket 20 to be pivoted about the pivot axis 21 until the structural member 4 contacts the support post 18 and the seating flange 24 abuts the assembly platform 2. Thus, an important feature of the present invention is the alignment of the orientation finger 22 of the orientation bracket 20 in an orientation aperture 6 formed in the structural member 4.

The orientation aperture 6 and the orientation finger 22 cooperate to indicate the proper orientation of the structural member 4. It will be recognized that, if the structural member 4 is not properly oriented when positioned within the orientation bracket 20, the orientation finger 22 thereof will not be permitted to interact with orientation aperture 6 of the structural member 4 and the structural member 4 will not be properly seated in the orientation jig 10. This unseated condition provides a clear indication that the orientation of the structural member 4 is improper and that the structural member 4 must be rotated or otherwise shifted. In practice, if the structural member is properly oriented, the member is locked into position via a clamp (not shown) or other means to permit subsequent welding or other assembly processes to be undertaken.

It will be recognized by those of skill in the art that it may or may not be necessary to provide the structural element 4 with an independent and distinct orientation aperture 6 in order for the orientation jig 10 of the present invention to be functional. That is to say that, while it has been shown herein that the orientation aperture 6 is specifically provided for the purpose of cooperating with the orientation finger 22, an alternative approach might include modification of the orientation finger 22 with respect to its location on the assembly platform 2 or with respect to its configuration or profile such that the orientation finger 22 can be inserted into a pre-existing component mounting aperture on the structural member 4. As an example of such an alternative approach, the orientation bracket 20 might be modified to cooperate with the the L-shaped aperture 7 on structural members **4*f* shown in FIG. 1 to provide the objectives and advantages of the orientation jig 10 of the present invention. Furthermore, while the present invention has been described and illustrated as having a male orientation finger on the orientation jig and a female orientation aperture on the structural member, it will be understood that this male/female relationship can be interchanged such that the structural member 4** can be provided with a protruding orientation element while the orientation jig can be provided with a cooperative receiving orientation element. It will be further recognized that the orientation jig of the present invention can be modified for use in mounting specific devices onto a structural element in a particular orientation with respect thereto.

While it is intended that the orientation jig 10 of the present invention merely provides an assembly jig for facilitating proper orientation of each structural member with respect to other structural members, it will be appreciated that the orientation elements can be produced and positioned on the structural members with such precision that the orientation jig of the present invention can also be utilized to provide accurate positioning of the work pieces on the assembly bench for subsequent welding operations. However, it shall be recognized that additional clamping mechanisms may be preferable for mass production processes which may include a robotically-operated welding machine. Thus, in the preferred practice of the present invention, once the frame members are suitably oriented with respect to one another on the assembly platform, each frame member is further secured in precise alignment with one another for subsequent welding.

In recapitulation, the orientation jig of the present invention includes a pivotable orientation bracket having an orientation finger for insertion into an orientation aperture to assure proper orientation of a structural member on an assembly platform. Because each orientation aperture is matingly cooperative with an orientation element on the assembly jig, the present invention prevents the improper orientation of a structural member during the assembly process.

It is therefore evident that there has been provided, in accordance with the present invention, an assembly jig that fully satisfies the aims and advantages of the invention as hereinabove set forth. While this invention has been described in conjunction with a preferred embodiment thereof, it is evident that many alternatives, modifications, and variations will be apparent to those skilled in the art. Accordingly, the present application for patent is intended to embrace all such alternatives, modifications, and variations as are within the broad scope and spirit of the appended claims.

I claim:

1. An orientation jig for placing a structural member in a predetermined orientation on an assembly platform with the structural member including an orientation element, said orientation jig, comprising:

a mounting fixture; and an orientation bracket mounted pivotably on said mounting fixture for cooperating with the orientation element to align the structural member in the predetermined orientation wherein said orientation bracket includes a seating flange for supporting said orientation bracket against the assembly platform with said structural member mounted in said orientation bracket, said seating flange including a seating shaft having a support face for supporting the structural member in said orientation bracket.

2. The orientation jig of claim 1, wherein:

the orientation element of the structural member includes an orientation aperture; and said orientation bracket includes an orientation protrusion adapted to be mated with the orientation aperture to insure that the structural member is positioned in the predetermined orientation.

3. The orientation jig of claim 2, further including means for withdrawing said orientation finger from the orientation aperture upon removal of the structural member from said orientation bracket.

4. The orientation jig of claim 3, wherein said withdrawal means includes means for resiliently urging said orientation finger in a direction away from the orientation aperture upon removal of the structural member from said orientation bracket.

5. The orientation jig of claim 4, wherein said urging means is coupled to said orientation bracket and said mounting fixture for rotating said orientation bracket.

6. The orientation jig of claim 1, wherein said seating shaft includes:

a threaded shaft member; and an adjustment nut cooperating with said threaded shaft for selectively adjusting the height of the support face.

7. The orientation jig of claim 1, wherein said orientation element is adapted for mounting components onto said structural member.

8. The orientation jig of claim 1, further including means for mounting said mounting fixture on the assembly platform.

* * * * *